(No Model.)
W. S. HULL.
ELECTRIC JAIL PLATE.
No. 480,099. Patented Aug. 2, 1892.
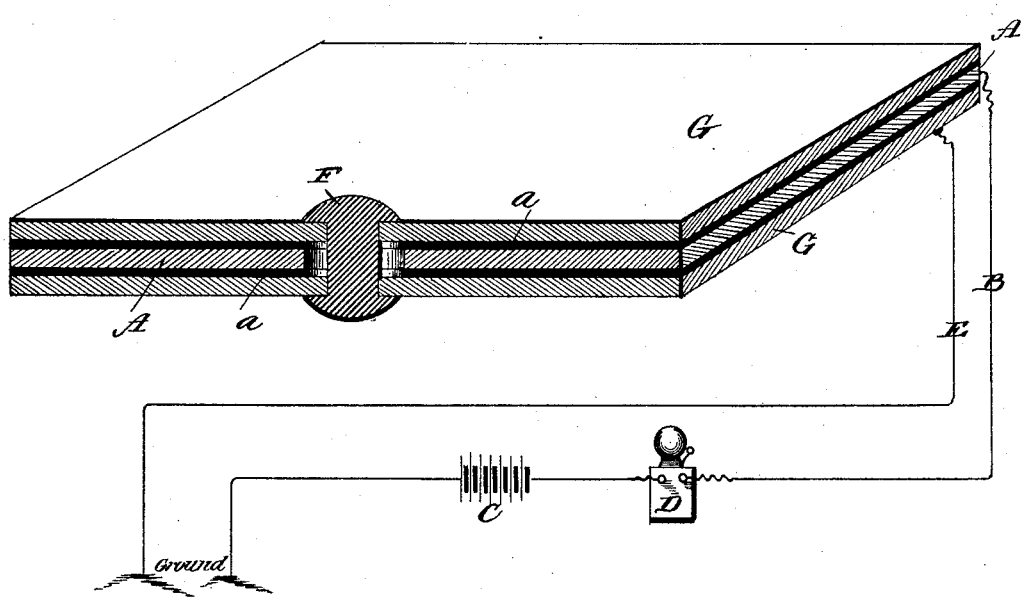
Witnesses
L. C. Hills
E. H. Bond
Inventor:
William S. Hull,
by E. B. Stocking
Attorney

UNITED STATES PATENT OFFICE.

WILLIAM S. HULL, OF SHEFFIELD, ALABAMA.

ELECTRIC JAIL-PLATE.

SPECIFICATION forming part of Letters Patent No. 480,099, dated August 2, 1892.

Application filed December 8, 1891. Serial No. 414,405. (No model.)

*To all whom it may concern:*

Be it known that I, WILLIAM S. HULL, a citizen of the United States, residing at Sheffield, in the county of Colbert, State of Alabama, have invented certain new and useful Improvements in Electric Jail-Plates, of which the following is a specification, reference being had therein to the accompanying drawing.

This invention relates to certain new and useful improvements in electric plates designed more particularly for use in jails, banks, and other places where iron or steel work is used to confine prisoners or to prevent the breaking in of burglars. It is capable of use in any structure where such protection is required. The plate is usually in three plies, the center one being insulated from the outside ones. The two outside plies will be usually electrically connected with the ground, although this is not essential in all cases. The interiorly-located plate is continuously connected electrically, even if made in sections, and is connected by a wire or other conductor with an electric battery and alarm-bell, the circuit being so arranged that it is not complete until the metal plates that are insulated apart come in electric contact. Thus it will be seen that the interior plate, being connected with the ground and with the alarm-bell and battery and the outside plate or plates being connected with the ground, all that is necessary to form a complete circuit is to bring the inside plate and the outside plate or plates in electric contact. If a drill or other metal implement is used to penetrate the plate, as soon as one plate is punctured and the tool reaches the other the connection is made and the alarm is sounded.

In jails, where the cells are detached from the walls of the building and set away from them, three-ply work will be most desirable; but in safes and bank-vaults two plies can be advantageously employed. In either case any number of plies can be used; but not more than three plies will generally be necessary. It is not essential to have any ground connection, as a double wire can be run from the battery with one pole connected with the interior plate and one connected with the exterior plate. The desired or particular work to be set up will in each case determine which arrangement is most suited to the occasion.

Other objects and advantages of the invention will hereinafter appear, and the novel features thereof will be specifically defined by the appended claims.

The invention is clearly illustrated in the accompanying drawing, which, with the letters of reference marked thereon, forms a part of this specification, and in which is shown a sectional perspective view of one of my improved plates, with the connections shown in diagrammatic elevation.

My improved plate may be used for the walls, floors, or ceilings of banks, jails, or other buildings, the construction and connections being substantially similar in all instances, varying, perhaps, somewhat according to the conditions under which it is to be used.

Referring now to the details of the drawing by letter, A designates the interior plate or ply, which may be in sections or of one integral piece and of a size and shape to conform to the conditions under which it is to be used and the position in which it is to be placed. It is connected by a wire or other conductor B with an electric battery C and alarm-bell D, both of any well-known or approved forms of construction. This interior plate or ply is, if made in sections, continuously connected electrically together and is insulated from the outer plate or ply or plates or plies by the insulating material $a$, as shown, the outer plate or plates G being usually electrically connected with the ground, as by the wire or other conductor E. The different plates or plies are connected by suitable means, as a rivet F, which is disconnected from the interior plate or ply, as seen in the drawing.

With the parts thus constructed and arranged the operation will be readily understood and, briefly stated, is as follows: The plates or plies being insulated from each other, the interior ply being connected with the alarm-bell and battery and one ground connection, and the outside plate or plates being connected with the ground, all that is necessary to form a complete circuit and sound the alarm is to bring the inside plate and the outside plate or plates in electric contact. This will be done, say, for instance, if a metal tool, as a drill, is used to puncture the plate. As soon as one plate is penetrated and the tool reaches the other the connection is made and an alarm sounded. The advantages of such a construction and arrangement of parts, constituting the plates and their connection, will be readily appreciated.

Modifications in detail may be resorted to without departing from the spirit of the invention or sacrificing any of its advantages.

What I claim as new is—

1. A compound plate for the purpose described, comprising two outer plates, an intermediate insulated plate, and a bolt or rivet electrically disconnected from the intermediate plate and binding said plates together, and electrical connections extending from one of the outer plates and from the intermediate plate to a battery and to an alarm, substantially as specified.

2. An electrical plate for the walls of jails, safes, vaults, &c., consisting of two outer plates, an intermediate insulated plate, and bolts or rivets binding the plates together, the holes in the intermediate plate being larger than those of the outer plates, substantially as specified.

3. A safe, jail, or vault wall comprising outer plates, an intermediate plate, an interposed mass of insulating material upon both sides of the intermediate plate, and means for binding the plates together, said means being electrically disconnected from one of said plates, as set forth.

4. A jail, safe, or vault wall consisting of a plurality of plies of metal plates, all intermediate plies being insulated from the adjacent plies throughout their entire surfaces, plate-binding devices mechanically separated from one intermediate ply, and electrical connections between intermediate plies, a battery, an alarm, the ground, and an outer ply, substantially as shown and described.

In testimony whereof I affix my signature in presence of two witnesses.

WILLIAM S. HULL.

Witnesses:
D. A. SMITH,
JNO. T. HULL.